United States Patent [19]
Yamashita

[11] Patent Number: 5,351,779
[45] Date of Patent: Oct. 4, 1994

[54] SLIP CONTROL SYSTEM FOR VEHICLE

[75] Inventor: Tetsuhiro Yamashita, Hiroshima, Japan

[73] Assignee: Mazda Motor Corporation, Hiroshima, Japan

[21] Appl. No.: 186,641

[22] Filed: Jan. 26, 1994

[30] Foreign Application Priority Data

Jan. 27, 1993 [JP] Japan .................. 5-034176

[51] Int. Cl.5 .............. B60T 8/32; B60K 28/16
[52] U.S. Cl. .................... 180/197; 303/93;
303/100; 188/181 R
[58] Field of Search .............. 180/197; 303/93, 100,
303/103, 102, 105, 106, 107, 108, 110, 109,
113.2, 113.3; 364/424.1, 426.02, 426.03;
123/333, 336; 188/181 A, 181 C, 181 R;
192/1.23, 1.22, 1.24

[56] References Cited

U.S. PATENT DOCUMENTS 5,281,008 1/1994 Kawamura et al. .............. 303/100
5,295,552 3/1994 Kageyama et al. .............. 180/197

FOREIGN PATENT DOCUMENTS 1197160 8/1989 Japan .
4-32930 6/1992 Japan .

Primary Examiner—Douglas C. Butler
Attorney, Agent, or Firm—Sixbey, Friedman, Leedom & Ferguson

[57] ABSTRACT

Attraction control system for a vehicle detects the amount of slip of the driving wheels of the vehicle relative to the road surface and controls the engine output with a predetermined control variable so that the amount of slip of the driving wheels converges on a target value. The control variable for the traction control is limited when it is determined that the friction coefficient $\mu$ of the road surface is high and the engine speed is not higher than a predetermined value while the traction control is being effected. The limitation of the control variable is released when the engine speed increases by a predetermined value from a minimum engine speed to which the engine speed fell as a result of the traction control before limitation of the control variable.

19 Claims, 12 Drawing Sheets

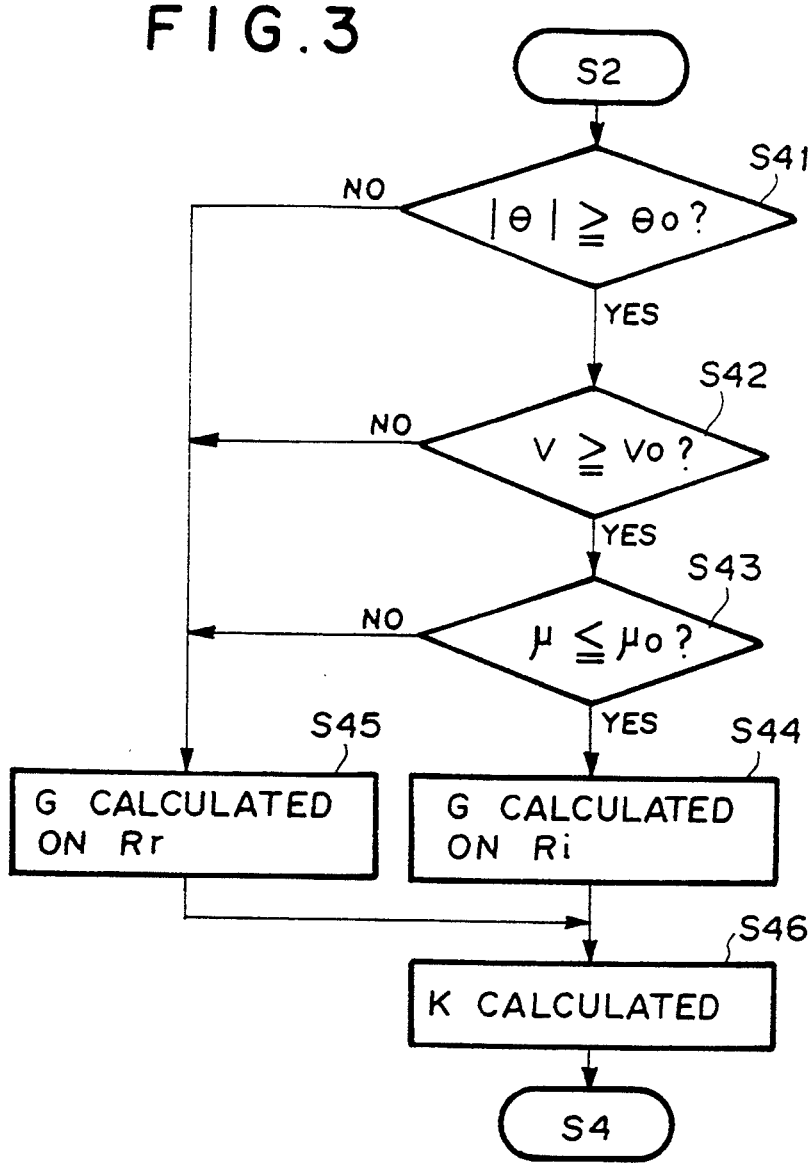
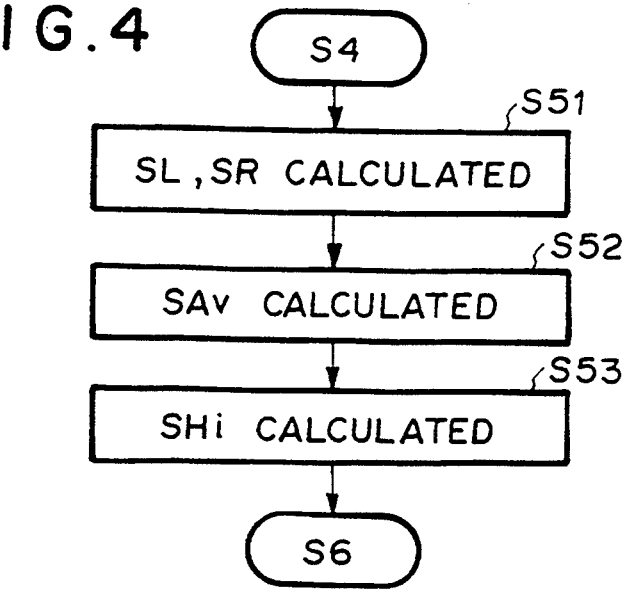

F I G. 6
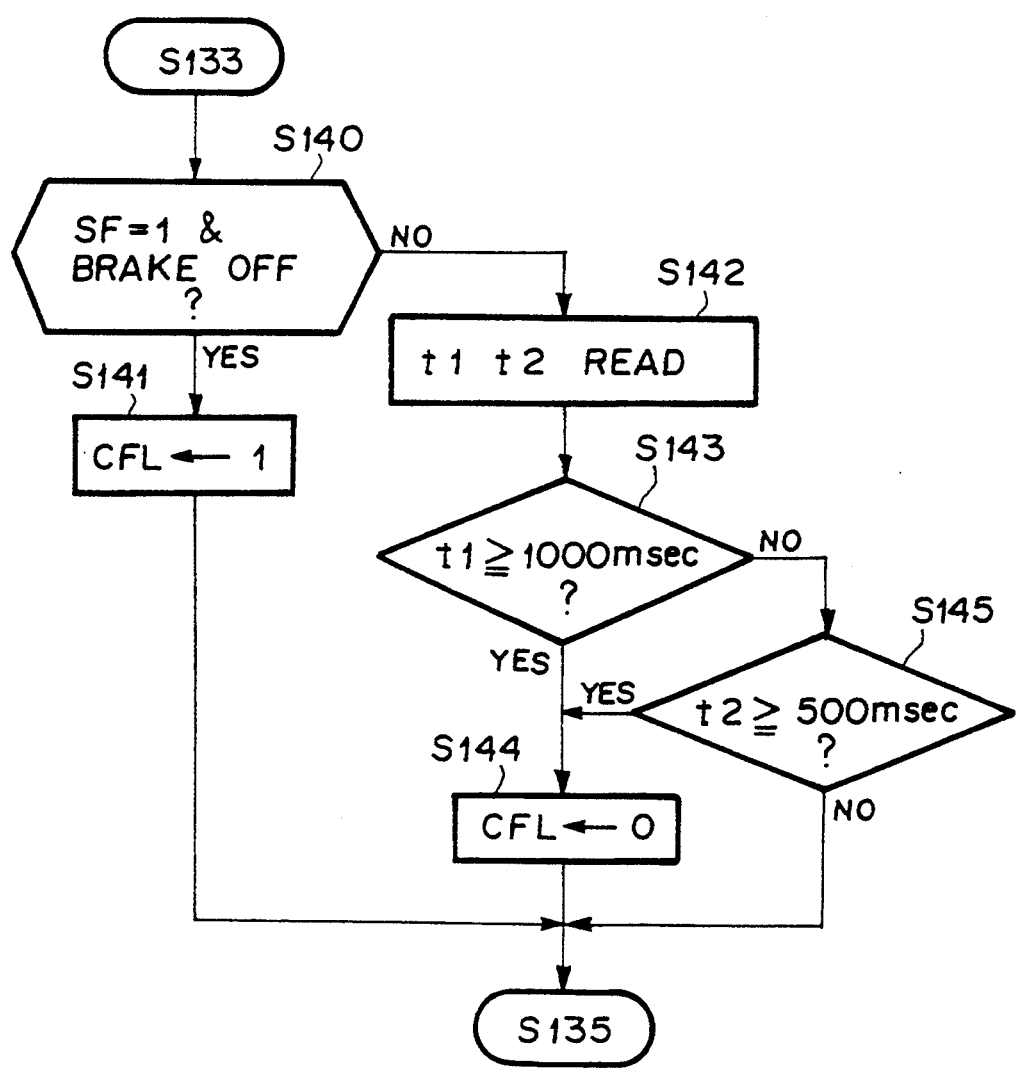

SLIP CONTROL SYSTEM FOR VEHICLE

BACKGROUND OF THE INVENTION

1. Field of the Invention

This invention relates to a slip control system for a vehicle.

2. Description of the Prior Art

There has been put into practice a traction control system which detects the amount of slip of the driving wheels and controls the engine output and/or application of braking force to the wheels so that the amount of slip of the driving wheels converges on a target value, thereby preventing deterioration of acceleration of the vehicle due to an excessive driving torque transmitted to the driving wheels. Many vehicles are provided with a traction control system as well as an anti-skid brake system. See, for instance, Japanese Unexamined Patent Publication No. 1(1989)-197160.

When the amount of slip of the driving wheels increases, for instance, during running on an ascending slope, the traction control is initiated to suppress the engine output. Suppression of the engine output tends to reduce the engine speed, which can result in engine stall, and to deteriorate accelerating performance of the vehicle. Such a tendency is enhanced when the friction coefficient $\mu$ of the road surface is high.

If the traction control system is arranged so that the traction control is interrupted when the engine speed falls below a predetermined value, the amount of slip of the driving wheels can increase again upon resumption of the traction control due to poor engine output suppression, which result in deterioration of the acceleration performance.

Further if the traction control is interrupted when the friction coefficient $\mu$ of the road surface is low, the amount of slip increases and not only the accelerating performance cannot be improved but also the driving stability is lost due to an excessive slip.

In Japanese Patent Publication No. 4(1992)-32930, there is disclosed a traction control system for a vehicle in which the wheel speed of the driving wheels is prevented from excessively falling at a low engine speed by less suppressing the engine torque when the engine speed is low than when the engine speed is high.

However since the amount of slip of the driving wheels for a given engine speed differs depending on the friction coefficient $\mu$ of the road surface, the traction control system in which the degree of reduction of the engine torque is determined depending solely on the engine speed cannot effect a fine control for preventing engine stall while ensuring an excellent accelerating performance.

Thus there has been a demand for a slip control system in which the slip control can be finely effected according to the friction coefficient $\mu$ of the road surface so that engine stall can be effectively prevented without sacrificing the accelerating performance.

Especially in a manual transmission vehicle, when the clutch is engaged upon start on an ascending slope while the vehicle slightly reverses, the amount of slip of the driving wheels abruptly increases and the traction control is initiated, which can result in reduction of the engine speed and engine stall.

SUMMARY OF THE INVENTION

In view of the foregoing observations and description, the primary object of the present invention is to provide a slip control system free from the problems described above.

In one aspect of the present invention, the slip control system comprises a traction control system which detects the amount of slip of the driving wheels of the vehicle relative to the road surface and suppresses the engine output with a predetermined control variable so that the amount of slip of the driving wheels converges on a target value and is characterized in that the control variable is limited when it is determined that the friction coefficient $\mu$ of the road surface is high and the engine speed is not higher than a predetermined value while the traction control is being effected, and the limitation of the control variable is released when the engine speed increases by a predetermined value from a minimum engine speed to which the engine speed fell as a result of the traction control.

When the control variable is limited, the engine output is less suppressed and more driving torque is transmitted to the driving wheels, thereby improving the accelerating performance and preventing engine stall.

In one embodiment of the present invention, it is determined that the friction coefficient $\mu$ of the road surface is high when the engine speed tends to fall as a result of the traction control.

Preferably calculation of the control variable is continued during interruption of the traction control and the traction control is resumed with the last control variable upon release of the limitation of the control variable so that slip of the driving wheels can be suppressed in an optimal manner as soon as possible.

In another aspect of the present invention, there is provided a slip control system for a vehicle comprising a traction control means for effecting traction control in which the amount of slip of the driving wheels of the vehicle relative to the road surface is detected and the engine output is controlled with a predetermined control variable so that the amount of slip of the driving wheels converges on a target value wherein the improvement comprises a reverse detecting means which detects that the vehicle once reversed before it began to run forward upon start on an ascending slope, and a first limiting means which limits the control variable for said traction control when the reverse detecting means detects that the vehicle once reversed before it began to run forward upon start on an ascending slope.

In still another aspect of the present invention, there is provided a slip control system for a vehicle comprising a traction control means for effecting traction control in which the amount of slip of the driving wheels of the vehicle relative to the road surface is detected and the engine output is controlled with a predetermined control variable so that the amount of slip of the driving wheels converges on a target value wherein the improvement comprises a friction coefficient determining means which determines whether the friction coefficient $\mu$ of the road surface is high or low, a limiting means which more limits the control variable for said traction control when the friction coefficient determining means determines that the friction coefficient $\mu$ of the road surface is high than when the friction coefficient determining means determines that the friction coefficient $\mu$ of the road surface is low, and an inhibiting means which inhibits the friction coefficient determining means from determining that the friction coefficient $\mu$ of the road surface is high after it determines that the friction coefficient μ of the road surface is low until the current traction control is terminated.

BRIEF DESCRIPTION OF THE DRAWINGS

FIG. 3 is a flow chart for illustrating the routine of step S3 of the flow chart shown in FIG. 2, FIG. 4 is a flow chart for illustrating the routine of step S5 of the flow chart shown in FIG. 2, FIG. 6 is a flow chart for illustrating the routine of step S134 of the flow chart shown in FIG. 5.

DESCRIPTION OF THE PREFERRED EMBODIMENT

Figure 1:
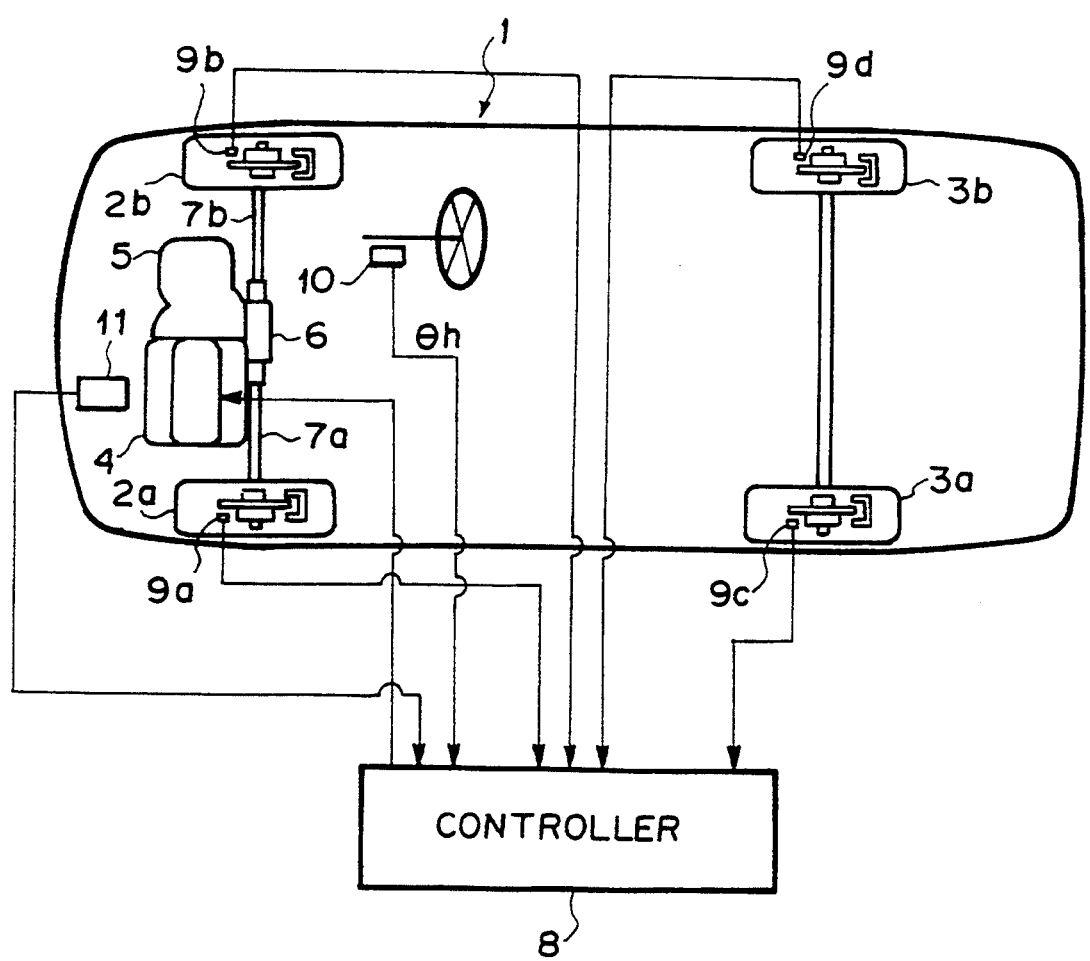
FIG. 1 is a schematic view of a vehicle provided with a slip control system in accordance with an embodiment of the present invention.

In FIG. 1, a vehicle 1 provided with a slip control system in accordance with an embodiment of the present invention has left and right front wheels 2a and 2b and left and right rear wheels 3a and 3b. Driving torque output from a V-6 engine 4 is transmitted to the left and right front wheels 2a and 2b through a manual transmission 5, a differential 6 and left and right drive shafts 7a and 7b. That is, in the vehicle 1, the front wheels 2a and 2b are the driving wheels and the rear wheels 3a and 3b are the driven wheels 3a and 3b.

A controller 8 effects fuel injection control and ignition timing control of the engine 4 and slip control (traction control) of the vehicle 1. The controller 8 has an engine control section for effecting the fuel injection control and the ignition timing control and a slip control section for effecting the slip control. Detecting signals from wheel speed sensors 9a to 9d which respectively detects the speeds of the wheels 2a, 2b, 3a and 3b, a steering angle sensor 10 which detects the turning angle of a steering wheel, an engine speed sensor 11 and brake sensors which respectively detect braking conditions on the wheels 2a, 2b, 3a and 3b are input into the controller 8.

The controller 8 comprises an input interface for receiving the detecting signals from the sensors described above, a pair of microcomputers including CPU, ROM and RAM, an output interface, driving circuits for a igniter and fuel injection valves and the like. In the ROM of the microcomputer for the engine control section are stored control programs for the fuel injection control and the ignition timing control and tables and maps for the same. In the ROM of the microcomputer for the slip control section are stored control programs for the slip control and tables and maps for the same. In the RAM there are provided various memories, soft counters and the like.

The slip control effected by the slip control section of the controller 8 will be briefly described, hereinbelow. The slip control section first calculates the actual radius of turn Rr, the steering-angle-based radius of turn Ri (to be described later), the vehicle speed V (speed of the vehicle body) and the friction coefficient μ of the road surface on the basis of the detecting signals from the sensors described above. The slip control section calculates the lateral acceleration G and calculates on the basis of the lateral acceleration G a correction coefficient k for correcting a threshold value for determination of slip and a target control value T so that they are reduced as the lateral acceleration G increases.

Then the slip control section calculates the amount of slip, effects determination of slip, sets the target control value T and calculates a control level FC for controlling the engine output and outputs a control signal for the slip control to the engine control section.

The slip control is mainly for preventing engine stall and improving the accelerating performance when the vehicle is to be started on slopes or is ascending slopes with a high friction coefficient μ of the road surface and for suppressing slip and improving the driving stability when the friction coefficient μ of the road surface is low.

The slip control (traction control) performed by the slip control section will be described with reference to FIGS. 2 to 15, hereinbelow.

Figure 2:
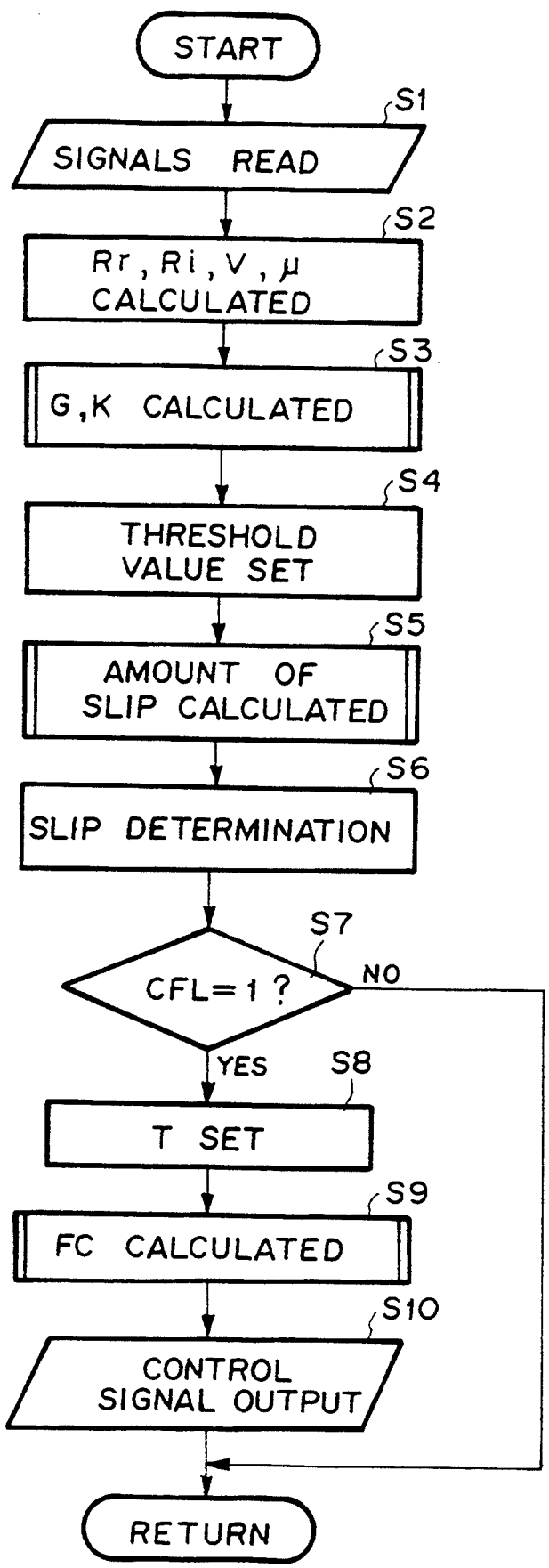
FIG. 2 is a flow chart for illustrating the routine of the slip control.

In the flow chart shown in FIG. 2, the slip control is initiated in response to start of the engine 4, and the slip control section first reads the detecting signals such as representing the steering angle θ from the sensors described above. (step S1) Then in step S2, the slip control section calculates the actual radius of turn Rr, the steering-angle-based radius of turn Ri, the vehicle speed V (speed of the vehicle body) and the friction coefficient μ of the road surface on the basis of the detecting signals. The actual radius of turn Rr is calculated according to the following formula (1) on the basis of the wheels speeds V1 and V2 of the driven wheels 3a and 3b detected by the wheel speed sensors 9c and 9d.

$$Rr = Min(V1, V2) \times Td \div |V1 - V2| + 0.5Td \quad (1)$$

wherein Td represents the tread of the vehicle (e.g., 1.7m).

The steering-angle-based radius of turn Ri substantially corresponds to the radius of the circle on which the vehicle moves when the steering tendency is neutral and is obtained by linear interpolation from the following table 1 on the basis of the absolute value of the detected steering angle θ.

TABLE 1

| $|\theta|$ | Ri(m) | $|\theta|$ | Ri(m) |
| --- | --- | --- | --- |
| 15° | 150 | 255° | 10 |
| 30° | 85 | 340° | 8 |
| 85° | 30 | 425° | 6 |

TABLE 1-continued

| $|\theta|$ | Ri(m) | $|\theta|$ | Ri(m) |
|---|---|---|---|
| 170° | 15 | 510° | 5 |

The vehicle speed V is determined as the higher of the wheel speeds V1 and V2 of the driven wheels 3a and 3b detected by the wheel speed sensors 9c and 9d.

The friction coefficient μ of the road surface is calculated on the basis of the vehicle speed V and the vehicle body acceleration Vg.

In the calculation of the friction coefficient μ of the road surface, a 100 msec-count timer and a 500 msec-count timer are used. Until 500 msec lapses after initiation of the slip control where the vehicle body acceleration Vg is not sufficiently large, the vehicle body acceleration Vg is calculated every 100 msec on the basis of the change in the vehicle speed V in the 100 msec according to the following formula (2). After 500 msec lapses after initiation of the slip control where the vehicle body acceleration Vg has become sufficiently large, the vehicle body acceleration Vg is calculated every 100 msec on the basis of the change in the vehicle speed V in each 500 msec according to the following formula (3). In the formulae (2) and (3), V(k) represents the present vehicle speed, V(k−100) represents the vehicle speed 100 msec before and V(k−500) represents the vehicle speed 500 msec before, with K1 and K2 respectively representing predetermined constants.

$$Vg = K1 \times \{V(k) - V(k-100)\} \quad (2)$$

$$Vg = K2 \times \{V(k) - V(k-500)\} \quad (3)$$

The friction coefficient μ of the road surface is calculated by three-dimensional interpolation according to the friction coefficient table shown in the following table 2 on the basis of the vehicle speed V and the vehicle body acceleration Vg thus obtained.

TABLE 2

| | 0 → Vg → increase | | | | | | | |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| V(Km) | 1.0 | 1.0 | 2.0 | 3.0 | 3.0 | 4.0 | 4.0 | 5.0 | 5.0 |
| ↓ | 1.0 | 1.0 | 2.0 | 3.0 | 4.0 | 4.0 | 5.0 | 5.0 | 5.0 |
| high | 1.0 | 1.0 | 2.0 | 3.0 | 4.0 | 5.0 | 5.0 | 5.0 | 5.0 |
| | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| | 1.0 | 2.0 | 3.0 | 5.0 | 5.0 | 5.0 | 5.0 | 5.0 | 5.0 |

Then in step S3, the lateral acceleration G and the lateral-acceleration-based correction coefficient k are calculated. This routine will be described with reference to FIG. 3, hereinbelow.

The lateral acceleration G is determined according to the radius of turn and the vehicle speed V. In this embodiment, the actual radius of turn Rr and the steering-angle-based radius of turn Ri are selectively used as the radius of turn. That is, the degree of tendency of the vehicle to deviate from the line defined by the steering-angle-based radius of turn Ri is determined on the basis of the road surface condition and the driving condition, and when the degree of the tendency is high, the steering-angle-based radius of turn Ri is used while when the degree is low, the actual radius of turn Rr is used.

The slip control section determines whether the absolute value of the steering angle θ is not smaller than a predetermined value θo in step S41 (FIG. 3), determines whether the vehicle speed V is not lower than a predetermined value Vo (step S42) and determines whether the friction coefficient μ of the road surface is not larger than a predetermined value μo (step S43). When it is determined that the absolute value of the steering angle θ is not smaller than the predetermined value θo, the vehicle speed V is not lower than the predetermined value Vo and the friction coefficient μ of the road surface is not larger than the predetermined value μo, the lateral acceleration G is calculated on the basis of the steering-angle-based radius of turn Ri (step S44) and otherwise the lateral acceleration G is calculated on the basis of the actual radius of turn Rr. (Step S45) Then the slip control section calculates the lateral-acceleration-based correction coefficient k on the basis of the lateral acceleration G calculated in step S44 or S45. (step S46)

The lateral acceleration G is calculated on the basis of the radius of turn R (the steering-angle-based radius of turn Ri or the actual radius of turn Rr) and the vehicle speed V according to the following formula (4).

$$G = V \times V \times (1/R) \times (1/127) \quad (4)$$

In step S46, the lateral-acceleration-based correction coefficient k is calculated according to a correction coefficient table (table 3).

TABLE 3

| G | k | G | k |
|---|---|---|---|
| 0 | 1 | 0.7 | 0.6 |
| 0.1 | 0.9 | 0.9 | 0.5 |
| 0.3 | 0.8 | 1 | 0 |
| 0.5 | 0.7 | | |

Then the slip control section sets in step S4 (FIG. 2) the threshold value for determination of slip. The threshold value for determination of slip is set to the product of a base threshold value and the lateral-acceleration-based correction coefficient k. The base threshold value is calculated by three-dimensional interpolation according to a first base-threshold-value table shown in table 4 or a second base-threshold-value table shown in table 5 on the basis of the vehicle speed V and the friction coefficient μ of the road surface. The first base-threshold-value table is for determining whether the slip control is to be initiated and the second base-threshold-value table is for determining whether the slip control is to be continued.

TABLE 4

| | | 0 → V → high | | | | |
|---|---|---|---|---|---|---|
| μ | 1 | +10 | +9 | +7 | +6 | +5 | +4 |
| | 2 | +11 | +10 | +9 | +8 | +7 | +6 |
| | 3 | +12 | +11 | +10 | +9 | +8 | +7 |
| | 4 | +13 | +12 | +11 | +10 | +9 | +8 |
| | 5 | +14 | +13 | +12 | +11 | +10 | +9 |

TABLE 5

| | | 0 → V → high | | | | |
|---|---|---|---|---|---|---|
| μ | 1 | +3 | +3 | +2 | +2 | +1 | +1 |
| | 2 | +4 | +4 | +3 | +3 | +2 | +2 |
| | 3 | +5 | +5 | +4 | +4 | +3 | +3 |
| | 4 | +6 | +6 | +5 | +5 | +4 | +4 |
| | 5 | +7 | +7 | +6 | +6 | +5 | +5 |

Then in step S5, the slip control section calculates the amount of slip.

In this step, the actual amounts of slip SL and SR of the left and right front wheels 2a and 2b are calculated by subtracting the vehicle speed V from the wheel speeds Vha and Vhb of the respective front wheels, then the average SAv of the amounts of slip SL and SR is calculated, and a maximum slip SHi is determined as the larger of the amounts of slip SL and SR. (steps S51 to S53 in FIG. 4)

In step S6, the slip control section performs determination of slip. The slip control section determines that the slip control is necessary when the following formula (5) is satisfied and sets slip flag SFL to 1.

$$SHi \geq \text{threshold value for determination of slip} \quad (5)$$

Figure 5:
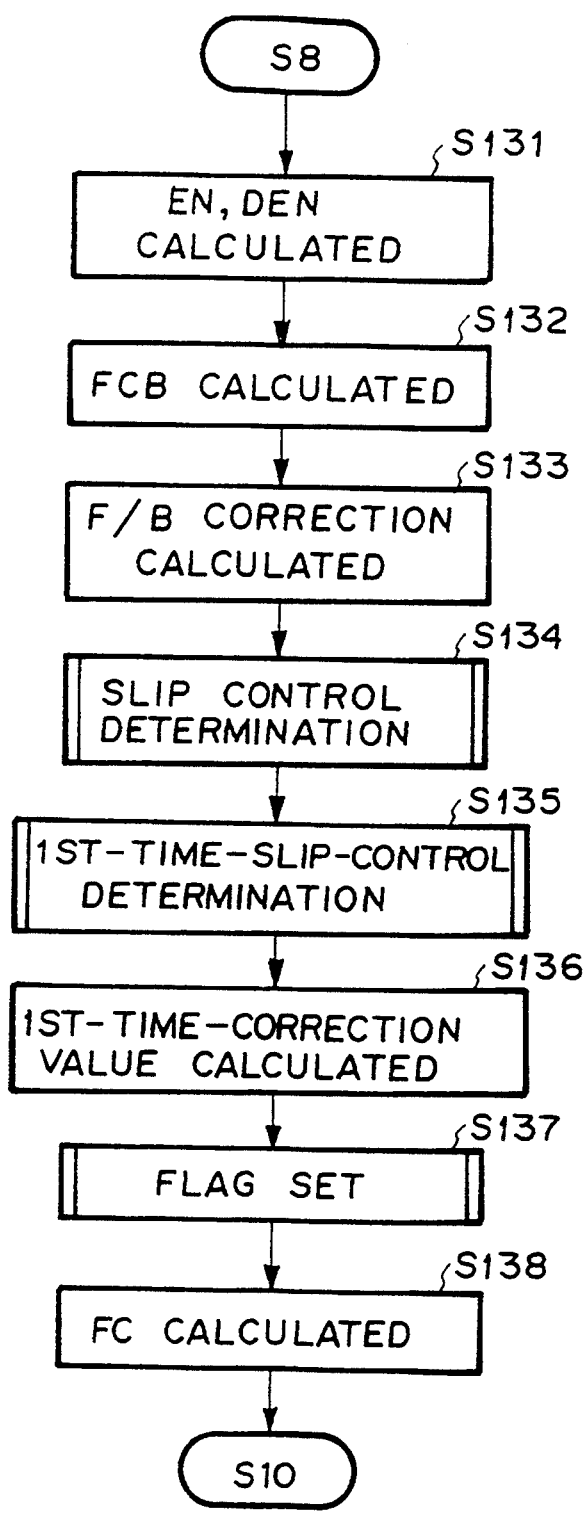
FIG. 5 is a flow chart for illustrating the routine of step S9 of the flow chart shown in FIG. 2.

When it has been determined that the slip control is not being effected (control flag CFL is 0) in step 134 shown in FIG. 5 (to be described later), the threshold value determined from the first base-threshold-value table shown in table 4 for determining initiation of the slip control is used as the threshold value for determination of slip, and when it has been determined that the slip control is being effected (flag CFL is 1) in step 134, the threshold value determined from the second base-threshold-value table shown in table 5 for determining continuation of the slip control is used as the threshold value for determination of slip.

Then in step S7, the slip control section determines whether control flag CFL is 1, and when it is determined that the control flag CFL is not 1(=0), that is, when it is determined that the slip control is not being effected, the slip control section immediately returns. On the other hand, when it is determined in step S7 that the slip control is being effected (the control flag CFL is 1), the slip control section sets the target control value T in step S8.

The target control value T is a target value of the amounts of slip of the front wheels 2a and 2b, and is calculated by multiplying a base target control value by the lateral-acceleration-based correction coefficient k as shown by the following formula (6). The base target control value is calculated by three-dimensional interpolation according to a base-target-control-value table shown in table 6.

$$T = \text{base-target-control-value} \times k \quad (6)$$

TABLE 6

|   |   | 0 → V → high |   |   |   |   |
|---|---|---|---|---|---|---|
| μ | 1 | +5.0 | +4.0 | +3.0 | +3.0 | +3.0 | +3.0 |
|   | 2 | +5.0 | +4.0 | +4.0 | +3.0 | +3.0 | +3.0 |
|   | 3 | +5.0 | +4.0 | +4.0 | +4.0 | +3.0 | +3.0 |
|   | 4 | +6.0 | +5.0 | +5.0 | +4.0 | +4.0 | +4.0 |
|   | 5 | +6.0 | +5.0 | +5.0 | +5.0 | +4.0 | +4.0 |

Then in step S9, the slip control section calculates the control level FC.

The control level FC is set within 0 to 15 by determining a base control level FCB on the basis of the deviation EN of the average SAv of the amounts of slip SL and SR from the target control value T and the rate of change thereof DEN and correcting the same taking into account a first-time-control correction and a feedback correction based on the preceding value FC(K−1) of the control value FC. The first-time-control correction is kept at +5 until the rate of change DSAv of the average SAv of the amounts of slip SL and SR is first reduced to 0 and at +2 until first-time-control flag STFL subsequently becomes 0. The routine in step S9 will be described in more detail with reference to the flow chart shown in FIG. 5.

The deviation EN of the average SAv of the amounts of slip SL and SR from the target control value T and the rate of change thereof DEN are first calculated according to the following formulae (7) and (8). (step S131)

$$EN = SAv(K) - T \quad (7)$$

$$DEN = DSAv = SAv(K) - SAv(K-1) \quad (8)$$

Then the base control level FCB is calculated according to a base-control-level table shown in table 7 on the basis of the deviation EN and the rate of change thereof DEN. (step S132)

TABLE 7

|  |  | DEN (g) |  |  |  |  |  |
|---|---|---|---|---|---|---|---|
|  |  | − ← 0 → + |  |  |  |  |  |
| EN | − | −3 | −2 | −1 | −1 | 0 | +1 | +1 |
| (Km/h) | ↑ | −3 | −1 | −1 | 0 | 0 | +1 | +1 |
|  | 0 | −2 | −1 | −1 | 0 | 0 | +1 | +1 |
|  | ↓ | −2 | −1 | 0 | 0 | +1 | +1 | +1 |
|  | increase | −2 | −1 | 0 | 0 | +1 | +1 | +2 |
|  |  | −1 | −1 | 0 | 0 | +1 | +1 | +2 |
|  |  | −1 | 0 | 0 | +1 | +1 | +1 | +2 |
|  |  | −1 | 0 | 0 | +1 | +1 | +1 | +3 |
|  |  | −1 | 0 | 0 | +1 | +1 | +2 | +3 |

In step S133, the preceding control level FC(K−1) is added to the base control level FCB thus obtained (the feedback correction) and in step S134, a slip-control determination is effected. Then a first-time-slip-control determination is effected in step S135 and a first-time-correction value for increasing the control level until the first slip determination is cancelled is calculated in step 136.

The routine in step S134 will be described in more detail with reference to the flow chart shown in FIG. 6.

The slip control section determines whether the slip flag SFL is 1 and the brake has not been applied. (step S140) When it is determined that the slip flag SFL is 1 and the brake has not been applied, the control flag CFL is set to 1 to indicate that the slip control is being effected (step S141) and then the slip control section performs step S135. When it is not determined in step S140 that the slip flag SFL is 1 and the brake has not been applied, the count t1 of a first counter which is provided in the slip control section and counts the duration for which the slip flag SFL keeps at 0 and the count t2 of a second counter which is provided in the slip control section and counts the duration for which the condition, FC≦3, DSAv≦0.3 g, keeps being satisfied are read out in step S142. When the count t1 is not smaller than 1000 msec or when the count t2 is not smaller than 500 msec, the control flag CFL is reset to 0 and then the slip control section performs step S135.

Figure 7:
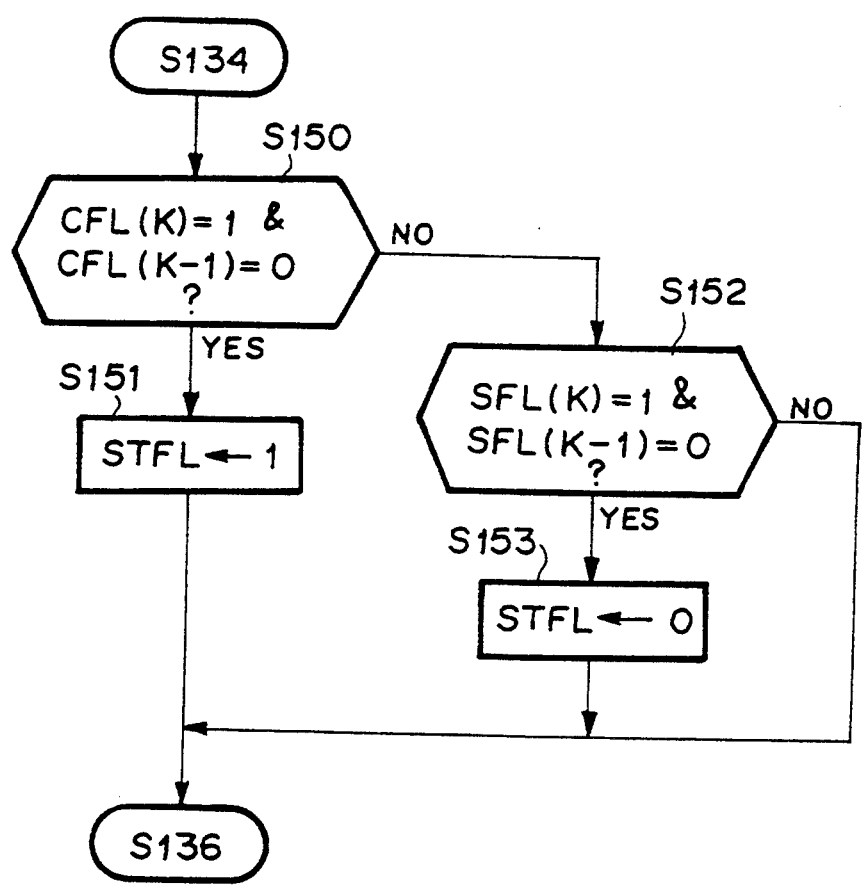
FIG. 7 is a flow chart for illustrating the routine of step S135 of the flow chart shown in FIG. 5.

The routine in step S135 will be described in more detail with reference to the flow chart shown in FIG. 7.

When the present control flag CFL(K) is 1 and at the same time the preceding control flag CFL(K−1) is 0 (step S150), the slip control section proceeds to step S136 after setting first-time-slip-control flag STFL to 1 in step S151. Otherwise the slip control section determines in step S152 whether the present slip flag SFL(K) is 0 and at the same time the preceding slip flag SFL(K−1) is 1. When it is determined that the present slip flag SFL(K) is 0 and at the same time the preceding slip flag SFL(K−1) is 1, the slip control section proceeds to step S136 after resetting the first-time-slip-control flag STFL to 0 in step S153. Otherwise the slip control section directly proceeds to step S136.

In step S136, the slip control section sets the first-time-correction value to +2 when the first-time-slip-control flag STFL is 1 and the rate of change DSAv of the average SAv of the amounts of slip SL and SR (formula 8) is smaller than 0.

In step S137, the slip control section sets μ-determination flag F and in step S138, the slip control section calculates a control level FC by adding the first-time-correction value to the feedback-corrected base control level FCB and calculates a final control level FC by correcting the control level FC according to the μ-determination flag F.

Figure 8:
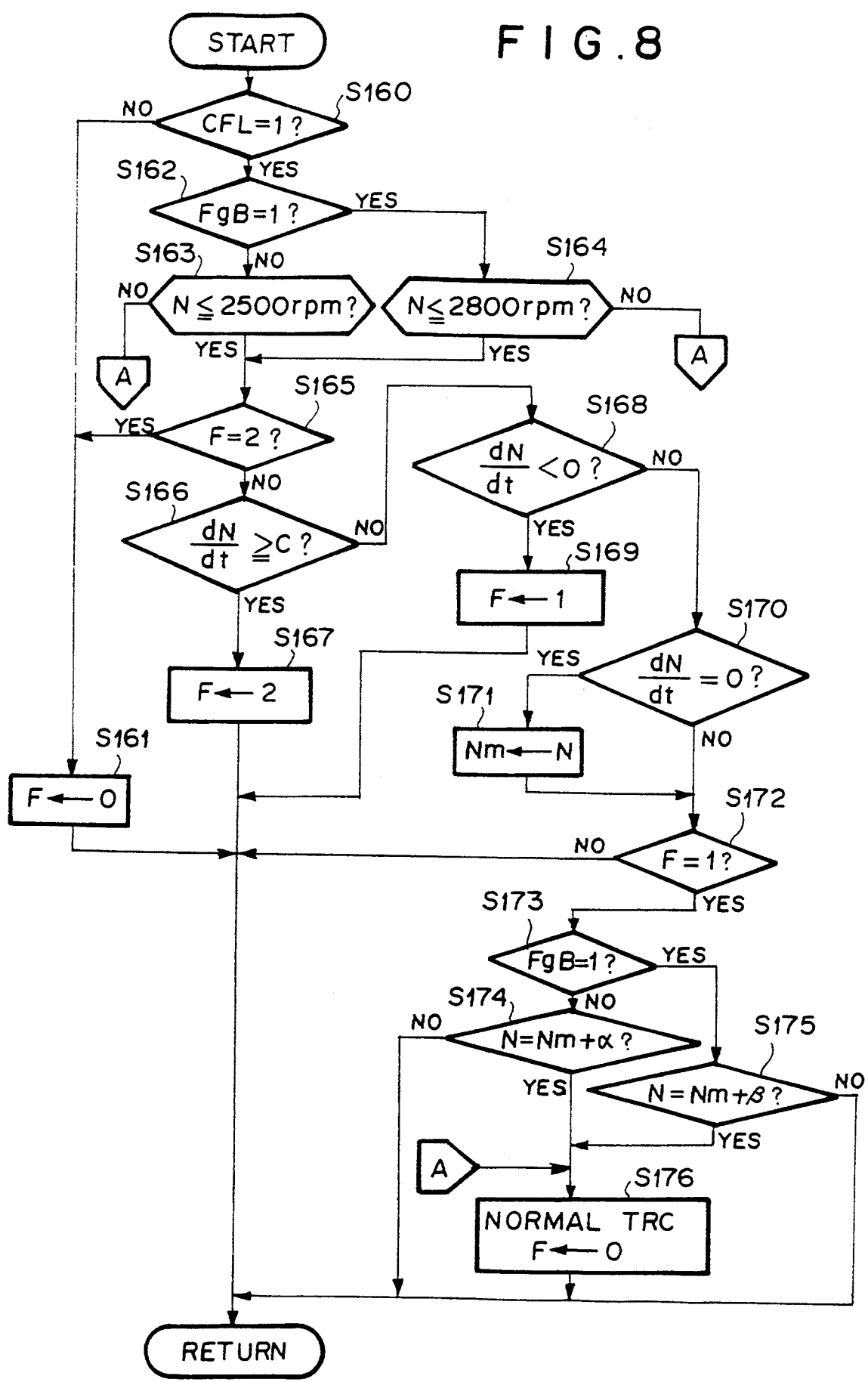
FIG. 8 is a flow chart for illustrating the routine of step S137 of the flow chart shown in FIG. 5.

The routine in step S137 will be described in more detail with reference to the flow chart shown in FIG. 8.

The μ-determination flag F is set to 0, 1 or 2 according to the friction coefficient μ of the road surface during the slip control while the vehicle is started on an ascending slope or is running on an ascending slope. In this particular embodiment, the friction coefficient μ of the road surface is determined from the change in the engine speed.

The slip control section first determines whether the control flag FCL is 1, that is, whether the slip control is being effected. (step S160) When it is determined that the control flag FCL is not 1, the slip control section sets the μ-determination flag F to 0 in step S161 and returns.

When it is determined that the control flag FCL is 1, the slip control section determines whether reverse flag FgB is 1. (step S162) The reverse flag FgB is set to 1 when the vehicle goes forward after once reversing upon starting on an ascending slope and is determined by the reverse determination processing upon starting on an ascending slope shown in FIG. 9 which is separately executed by an interruption handling routine.

When it is determined that the reverse flag FgB is not 1, the slip control section proceeds to step S165 when the engine speed N is not higher than 2500 rpm and to step S176 when the engine speed N is higher than 2500 rpm. (steps S163)

When it is determined that the reverse flag FgB is 1, that is, when the vehicle reversed before going forward upon starting on an ascending slope, which is the case where the engine is apt to stall and the accelerating performance is apt to deteriorates, the slip control section determines in step S164 whether the engine speed is not higher than 2800 rpm. The slip control section then proceeds to step S165 when the engine speed is not higher than 2800 rpm and otherwise to step S176.

In step S165, the slip control section determines whether the μ-determination flag F is 2. When it is determined that the μ-determination flag F is 2, the slip control section proceeds to step S161 and otherwise proceeds to step S166. In step S166, the slip control section determines whether the rate of increase dN/dt of the engine speed N is not lower than a predetermined value C which is a relatively large positive value. When it is determined that the former is not lower than the latter, the slip control section determines that the engine speed N has quickly increased due to slip of the driving wheels, which shows that the friction coefficient μ of the road surface is low, and sets the μ-determination flag F to 2. (step S167) When the μ-determination flag F is once set to 2, the slip control section proceeds to step S161 after step S165.

When it is determined in step S166 that the rate of increase dN/dt of the engine speed N is lower than a predetermined value C, the slip control section determines in step S168 whether the rate of change dN/dt of the engine speed N is negative. When the engine output is suppressed by the slip control during running an ascending slope, the engine speed N decreases. Based on this fact, the slip control section determines that the friction coefficient μ of the road surface is high when the rate of change dN/dt of the engine speed N is negative and sets the μ-determination flag F to 1 in step S169. Thereafter the slip control section returns.

After the μ-determination flag F is set to 1, the engine output suppression by the slip control is interrupted (calculation for the slip control is continued), and the engine speed N thereafter comes to increase in a few control cycles. When the answer to the question in step S168 turns to NO, the slip control section determines in step S170 whether the rate of change dN/dt of the engine speed N is 0. When it is determined that the rate of change dN/dt of the engine speed N is 0, the engine speed N at that time is stored as a minimum engine speed Nm, that is, the minimum engine speed Nm is updated. (step S171) After step S170 or S171, the slip control section proceeds to step S172 and determined whether the μ-determination flag F is 1. When it is determined that the μ-determination flag F is 1, the slip control section proceeds to step S173 and otherwise returns. In step S173, the slip control section determines whether the reverse flag FgB is 1.

When the vehicle did not reverse during starting on an ascending slope, the reverse flag FgB has been set to 0. Accordingly when it is determined that the reverse flag FgB is not 1, the slip control section determines whether the engine speed has increased by a predetermined value α(e.g., α=200 rpm) from the minimum engine speed Nm. When it is determined that the engine speed has not increased by the predetermined value α, the slip control section returns. On the other hand, when it is determined that the engine speed has increased by the predetermined value α, the slip control section sets the μ-determination flag F to 0 and effects the normal traction control. (step S176) That is, the μ-determination flag F is kept at 0 until the engine speed N increases to Nm +α.

When it is determined that the reverse flag FgB is 1 in step S173, the slip control section determines in step S175 whether the engine speed has increased by a predetermined value β (e.g., β=300 rpm) from the minimum engine speed Nm. When it is determined that the engine speed has not increased by the predetermined value β, the slip control section returns. On the other hand, when it is determined that the engine speed has increased by the predetermined value β, the slip control section sets the μ-determination flag F to 0 and effects the normal traction control. (step S176) That is, the μ-determination flag F is kept at 0 until the engine speed N increases to Nm +β. Setting of the μ-determination flag F described above is also shown in FIG. 11.

Figure 9:
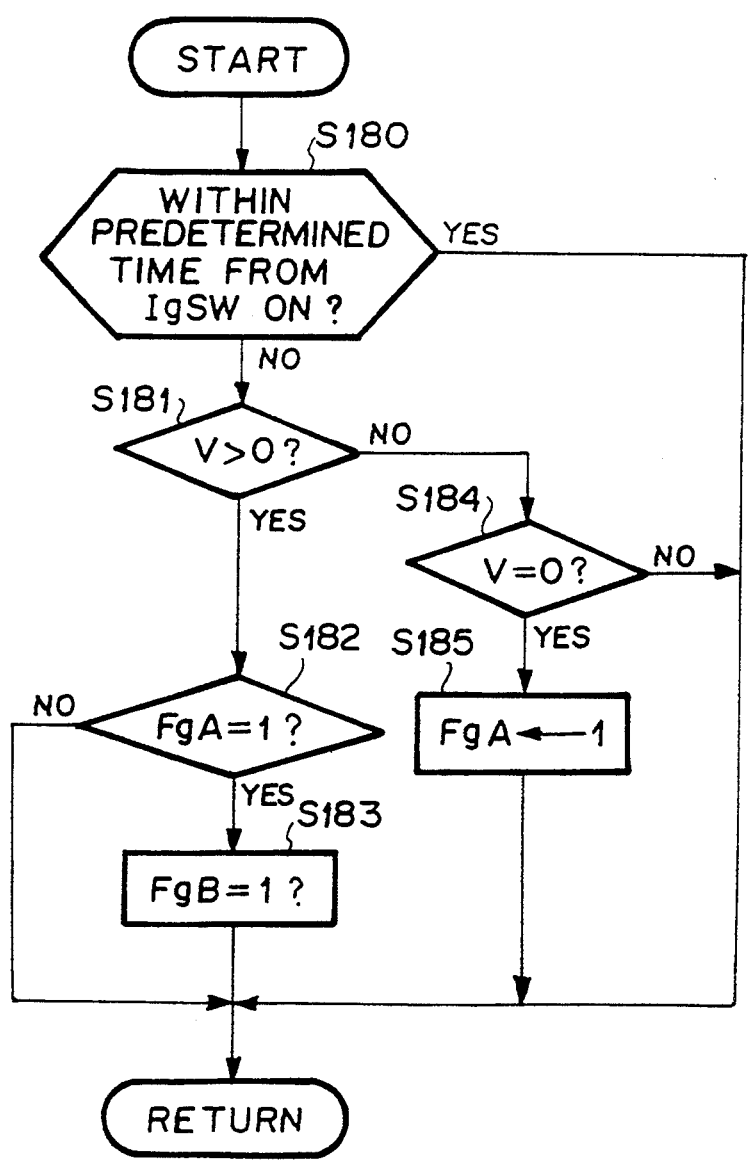
FIG. 9 is a flow chart for illustrating the routine of the reverse determination processing.

The reverse determination processing upon starting on an ascending slope will be described with reference to FIG. 9, hereinbelow.

The slip control section determines in step S180 whether it is within a predetermined time (e.g., 60 seconds) after the ignition switch is turned on. When it is determined that it is not within the predetermined time, the slip control section determines in step S181 whether the vehicle speed V is positive. (Due to the characteristics of the wheel speed sensor, the vehicle speed V is positive so long as the vehicle is running irrespective of the direction, forward or rearward.) Since the slip control is not effected when the vehicle is stopping, the answer to the question in step S181 is YES for the first time after the vehicle begins to move and the slip control is initiated and accordingly the slip control section determines whether flag FgA is 1 in step S182. The answer to the question in step S182 is first NO as will become apparent later and accordingly, the slip control section first returns. When the vehicle speed V subsequently becomes not positive and becomes 0, the slip control section sets flag FgA to 1. (steps S184 and S185) Then when the vehicle speed V subsequently becomes positive again, the slip control section proceeds to step S183 through step S182 and sets the reverse flag FgB to 1. The reverse flag FgB which indicates that the vehicle once reversed before it began to run forward when it is started on an ascending slope is thus set (to 1). However when the vehicle began to run forward without reversing, the reverse flag FgB is not set (i.e., kept at 0).

Figure 10:
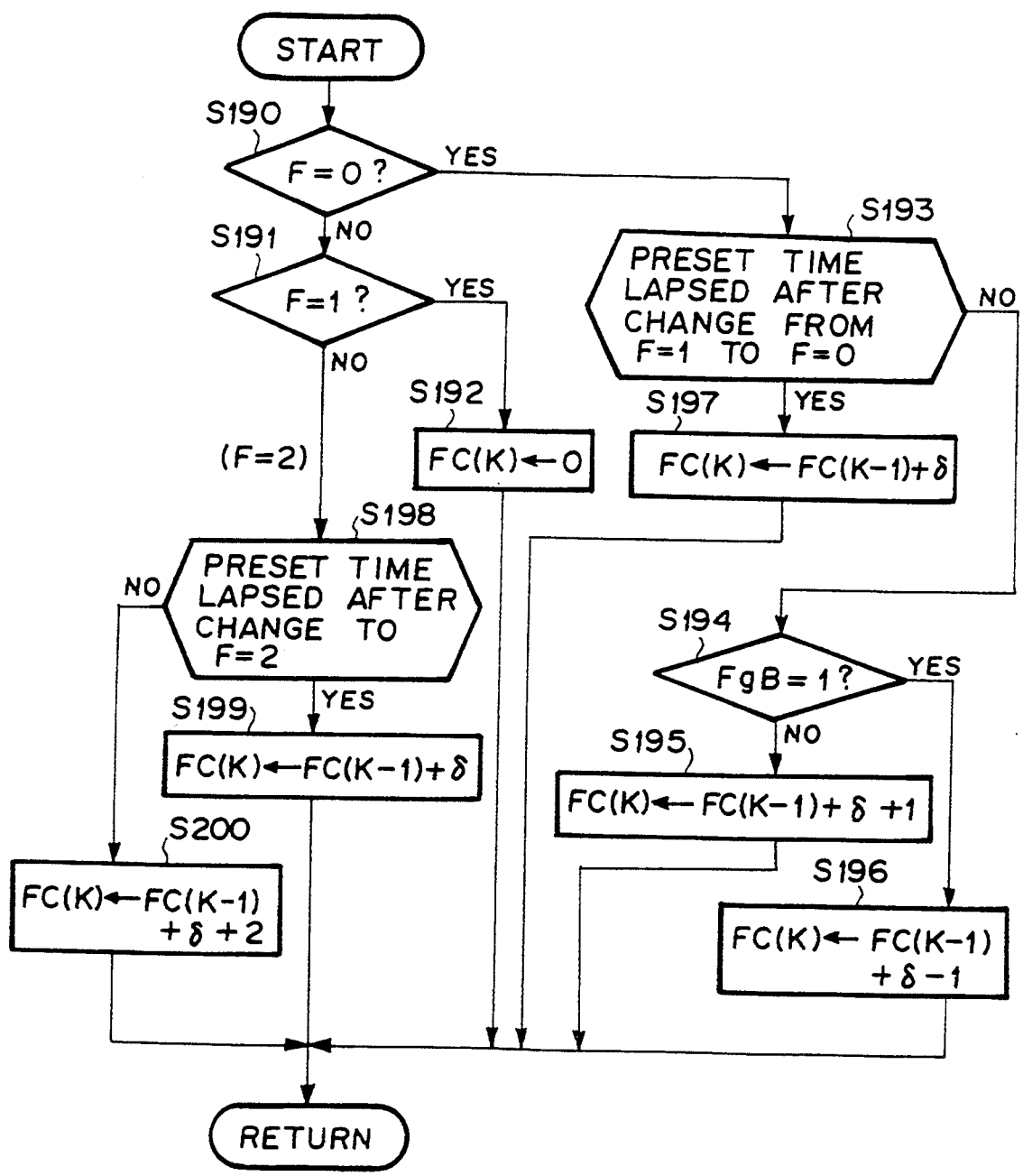
FIG. 10 is a flow chart for illustrating the routine of step S138 of the flow chart shown in FIG. 5.
Figure 11:
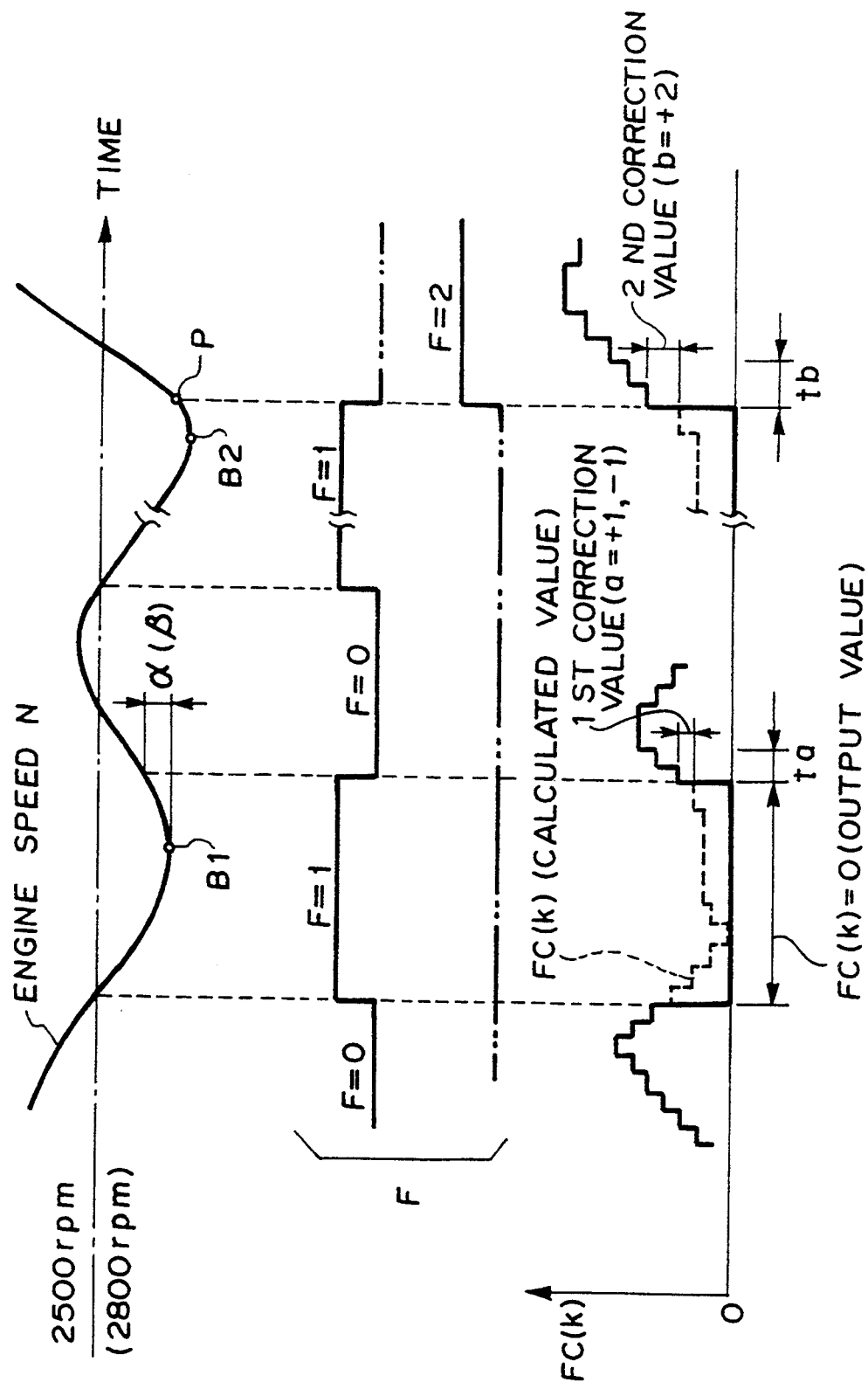
FIG. 11 is a time chart for illustrating the relation between the engine speed, the μ-determination flag F and the like upon starting on an ascending slope.

The final control level setting processing will be described with reference to FIG. 10, hereinbelow. In FIG. 10, FC(k) denotes the present final control level, FC(k−1) denotes the preceding final control level as a feedback value, and δ denotes the base control level FCB which is to be added at this time and may sometimes include the first-time-correction value.

When the $\mu$-determination flag F is kept at 0 and the normal slip control is to be effected, the slip control section executes steps S190, S193 and S197.

On the other hand, when the $\mu$-determination flag F has been set to 1 (the friction coefficient $\mu$ of the road surface is high) the final control level FC(k) is set to 0 (steps S191 and S192) to interrupt the slip control so that the engine output is not suppressed.

That is, when the engine output is suppressed to limit slip of the wheels, the engine speed N is lowered due to a high friction coefficient $\mu$ of the road surface, which can result in engine stall or deterioration of the accelerating performance. Therefore, the slip control is interrupted to avoid these problems. However, the present final control level FC(k) obtained by the calculation is stored though is output as 0, and the next final control level FC(k+1) is calculated on the basis of the present final control level FC(k) stored.

When the engine speed N increases to Nm+α or Nm+β and the $\mu$-determination flag F is reset from 1 to 0, the slip control section determines in step S193 whether a predetermined time ta (FIG. 11) has lapsed after the $\mu$-determination flag F was changed to 0. This determination is made by use of a soft counter not shown.

Until the predetermined time ta lapses, the answer to the question in step S193 is NO, and accordingly, the slip control section proceeds to step S194 and determines whether the reverse flag FgB is 1. When it is determined that the reverse flag FgB is not 1, which indicates that the vehicle did not reverse upon starting on an ascending slope, the present final control level FC(k) is calculated in step S195 by adding a first correction value a, (e.g., a=+1), according to the formula shown in order to suppress slip and improve the accelerating performance. That is, the first correction value a is added only for the predetermined time ta after the $\mu$-determination flag F is changed from 1 to 0.

On the other hand, when it is determined in step S194 that the reverse flag FgB is 1, which indicates that the vehicle reversed upon starting on an ascending slope and a large driving force is required, the present final control level FC(k) is calculated in step S196 by adding a first correction value a, (e.g., a=−1), according to the formula shown.

After lapse of the predetermined time ta, the slip control section proceeds to step S197 and sets the present final control level FC(k) in the same manner as in the normal slip control according to the formula shown though the first correction value a is subtracted (in the case of step S195) or added (in the case of step S196) in the first cycle after proceeding to step S197.

When it is determined that the $\mu$-determination flag F is not 0 in step S190 and at the same time it is determined that the $\mu$-determination flag F is not 1, that is, the $\mu$-determination flag F is 2 (the friction coefficient $\mu$ of the road surface is low), the slip control section determines in step S198 whether a predetermined time tb (FIG. 11) has lapsed after the $\mu$-determination flag F was changed to 2. Until the predetermined time tb lapses, the answer to the question in step S198 is NO, and accordingly, the slip control section proceeds to step S200.

In step S200, the present final control level FC(k) is calculated by adding a second correction value b, (e.g., b=+2), according to the formula shown in order to more suppress slip and improve the accelerating performance. That is, the second correction value b is added only for the predetermined time tb.

After lapse of the predetermined time tb, the slip control section proceeds to step S199 and sets the present final control level FC(k) in the same manner as in the normal slip control according to the formula shown though the second correction value b is subtracted in the first cycle after proceeding to step S199.

In step S10 in FIG. 2, the slip control section outputs control signals to the engine control section. The control signals includes those for causing the engine control section to retard the ignition timing and for causing the same to effect fuel cut.

Figure 12:
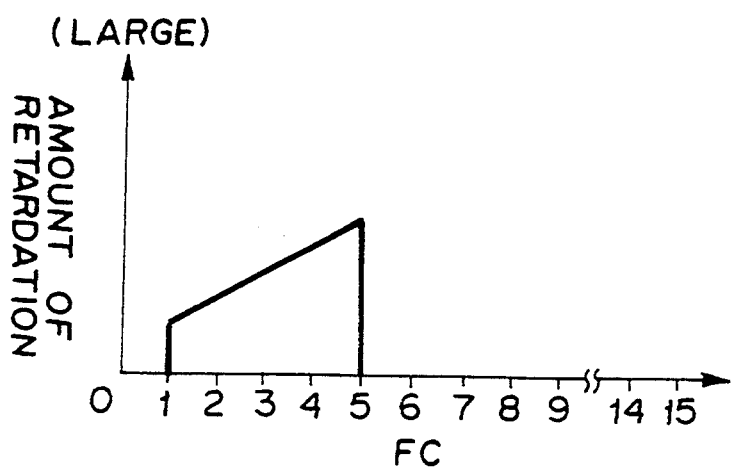
FIG. 12 is a map showing the relation between the control level and the amount of retardation of the ignition timing.
Figure 13:
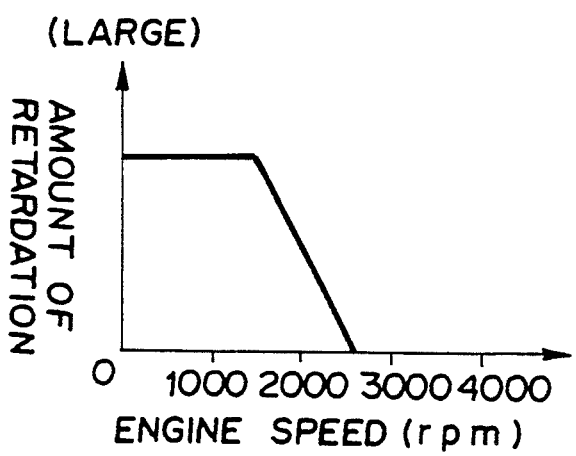
FIG. 13 is a map showing the relation between the engine speed and the amount of retardation of the ignition timing.
Figure 14:
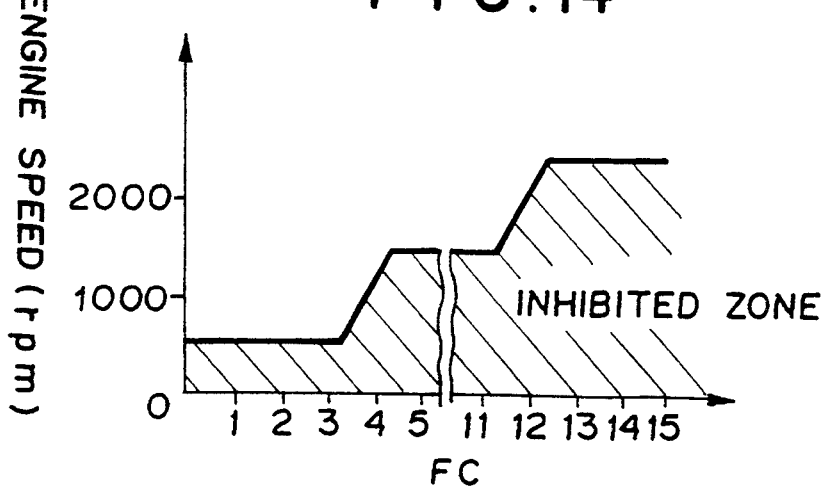
FIG. 14 is a view for illustrating the fuel cut inhibiting zone.

The ignition timing is retarded by an amount determined according to the map shown in FIG. 12 on the basis of the control level FC. In the high engine speed range, the maximum amount of the retardation of the ignition timing is limited based on the map shown in FIG. 13.

The fuel cut is effected by selecting one of No. 1 to No. 12 patterns shown in table 8 (fuel cut table) on the basis of the control level FC. As the control level FC becomes higher, the larger number of pattern is selected. In table 8, "x" indicates that fuel injection from the injector is cut. In the engine speed range determined for each control level FC shown in FIG. 14, fuel cut is inhibited.

TABLE 8

| pattern No. | \multicolumn{12}{c}{injecter number} | note |
| | 1 | 2 | 3 | 4 | 5 | 6 | 7 | 8 | 9 | 10 | 11 | 12 | |
| --- | --- | --- | --- | --- | --- | --- | --- | --- | --- | --- | --- | --- | --- |
| 0 | | | | | | | | | | | | | no fuel cut |
| 1 | x | | | | | | | | | | | | one C/L half cut |
| 2 | x | | | | | | x | | | | | | one C/L cut |

TABLE 8-continued

| pattern No. | \multicolumn{12}{c}{injecter number} | note |
|---|---|---|---|---|---|---|---|---|---|---|---|---|---|
| | 1 | 2 | 3 | 4 | 5 | 6 | 7 | 8 | 9 | 10 | 11 | 12 | |
| 3 | x | | | x | | x | | | | | | | |
| 4 | x | | | x | | | x | | | x | | | two C/L cut |
| 5 | x | x | | x | | | x | | | x | | | |
| 6 | x | x | | x | | | x | x | | x | | | three C/L (one bank) cut |
| 7 | x | x | | x | x | | x | x | | x | | | |
| 8 | x | x | | x | x | | x | x | | x | x | | four C/L cut |
| 9 | x | x | x | x | x | | x | x | | x | x | | |
| 10 | x | x | x | x | x | | x | x | x | x | x | | five C/L cut |
| 11 | x | x | x | x | x | x | x | x | x | x | x | | |
| 12 | x | x | x | x | x | x | x | x | x | x | x | x | all C/L cut |

The operation of the slip control system can be summarized as follows. As shown in the time chart in FIG. 11, when the engine output is suppressed by the slip control upon starting on an ascending slope or during running on an ascending slope and the engine speed N lowers below a predetermined value (2500 rpm or 2800 rpm), the engine can stall or the accelerating performance can greatly deteriorate especially in a vehicle provided with a manual transmission.

In this embodiment, in order to prevent engine stall and to improve the accelerating performance, the friction coefficient $\mu$ of the road surface is determined through the behavior of the engine speed N during the slip control and the final control level FC(k) is set according to the $\mu$-determination flag F set according to the friction coefficient $\mu$ of the road surface.

That is, when the engine speed N tends to be reduced due to the slip control in the low engine speed range, it is determined that the friction coefficient $\mu$ of the road surface is high and the $\mu$-determination flag F is set to 1. When the $\mu$-determination flag F is 1, the slip control is interrupted and the engine output is increased, thereby preventing engine stall.

When the engine speed N begins to increase in response to interruption of the slip control from the time B1 at which the engine speed N is minimum and increases by the predetermined value $\alpha$ (=200 rpm) from the minimum engine speed Nm, the $\mu$-determination flag F is reset to 0 to resume the slip control. However even when the $\mu$-determination flag F is 1, calculation of the final control level FC(k) is continued and the calculated final control level FC(k) is stored, and the final control level FC(k) upon resumption is set on the basis of the stored final control level FC(k−1) (the first correction value a is added thereto or subtracted therefrom for the predetermined time ta), slip of the wheels can be effectively suppressed with a high control level from the beginning of resumption of the slip control, thereby effectively improving acceleration.

On the other hand, when the rate of increase of the engine speed N after time B2 at which the engine speed N is minimized increases to a predetermined value C (at time P), it is determined that the friction coefficient $\mu$ of the road surface is low and the $\mu$-determination flag F is set to 2 to resume the slip control. When the slip control is resumed, the final control level FC(k) is set on the basis of the stored final control level FC(k−1) (the second correction value b is added thereto for the predetermined time tb), slip of the wheels can be more effectively suppressed with a high control level from the beginning of resumption of the slip control, thereby effectively improving drivability and acceleration.

When the vehicle slightly reversed before going forward upon starting on an ascending slope, the predetermined engine speed is increased to 2800 rpm and at the same time the $\mu$-determination flag F is reset to 0 when the engine speed N increases by the predetermined value $\beta$(=300 rpm), which is larger than $\alpha$, from the minimum engine speed Nm, thereby further enhances the function of preventing engine stall and improving acceleration.

Since the engine is more apt to stall as the gradient of the slope increases, the load on the vehicle increases, the altitude increases and the temperature of the engine coolant lowers, it is preferred that the predetermined engine speed (2500 rpm or 2800 rpm) be changed, the first correction value a be changed in such a direction as to increase the engine output and/or the second correction value b be changed in such a direction as to more suppress slip of the wheels according to these factors.

Figure 15:
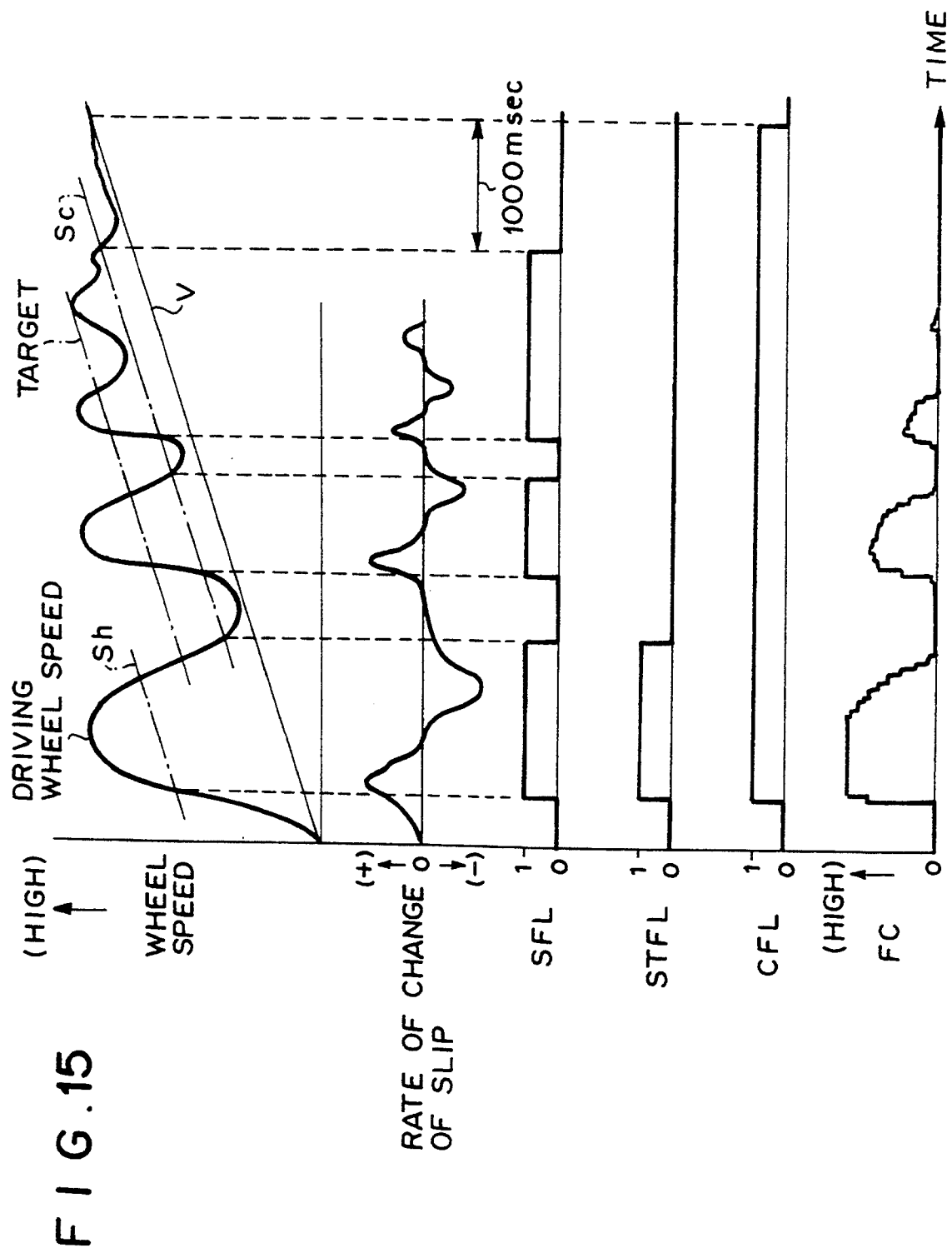
FIG. 15 is a time chart for illustrating the overall slip control action.

Further as shown in FIG. 15, the threshold value Sh for determining whether the slip control is to be initiated is set relatively high and even if the wheel speed of the driving wheels increases due to external forces and the like, the slip control is not initiated so long as the wheel speed does not exceed the threshold value Sh. When the wheel speed of the driving wheels exceeds the threshold value Sh, the slip flag SFL is set to 1, and when the brake has not been applied, the control flag CFL and the first-time-slip-control flag STFL are set to 1 and the slip control is initiated.

When it is determined that the degree of understeer tendency is high during turning, the lateral acceleration G of the vehicle is calculated on the basis of the steering-angle-based radius of turn Ri. Since the steering-angle-based radius of turn Ri is smaller than the actual radius of turn Rr, the lateral acceleration G of the vehicle calculated on the basis of the steering-angle-based radius of turn Ri becomes larger and the correction coefficient k becomes smaller, which results in a relatively low threshold value Sh for determining whether the slip control is to be initiated. Accordingly, the slip control is initiated earlier and the driving torque of the driving wheels is suppressed earlier, whereby the understeer tendency can be prevented from becoming excessively high.

On the other hand, when the understeer tendency is relatively low, the lateral acceleration G of the vehicle is calculated on the basis of the actual radius of turn Rr. Accordingly, the threshold value Sh for determining whether the slip control is to be initiated and the target control value T are precisely corrected to conform to the actual lateral acceleration.

The present invention can be also applied to vehicles provided with an automatic transmission.

What is claimed is:

1. A slip control system for a vehicle comprising a traction control means for effecting traction control in which the amount of slip of the driving wheels of the vehicle relative to the road surface is detected and the engine output is controlled with a predetermined control variable so that the amount of slip of the driving wheels converges on a target value wherein the improvement comprises a first determining means which determines that the friction coefficient $\mu$ of the road surface is high, a limiting means which limits the control variable for said traction control when the first determining means determines that the friction coefficient $\mu$ of the road surface is high and the engine speed is not higher than a predetermined value while the traction control is being effected, and a limitation releasing means which releases the limitation of the control variable when the engine speed increases by a predetermined value from a minimum engine speed to which the engine speed fell as a result of the traction control before limitation of the control variable.

2. A slip control system as defined in claim 1 in which said first determining means determines that the friction coefficient $\mu$ of the road surface is high when the engine speed tends to fall as a result of the traction control.

3. A slip control system as defined in claim 1 in which said traction control means continues calculation of the control variable during interruption of the traction control and resumes the traction control with the last control variable upon release of the limitation of the control variable.

4. A slip control system as defined in claim 1 further comprising a second determining means which determines that the friction coefficient $\mu$ of the road surface is low when the rate of increase of the engine speed as a result of the limitation of the control variable by the limiting means is higher than a predetermined value, and an inhibiting means which inhibits the first determining means from determining that the friction coefficient $\mu$ of the road surface is high after the second determining means determines that the friction coefficient $\mu$ of the road surface is low until the current traction control is terminated.

5. A slip control system as defined in claim 1 in which said vehicle is provided with a manual transmission.

6. A slip control system for a vehicle comprising a traction control means for effecting traction control in which the amount of slip of the driving wheels of the vehicle relative to the road surface is detected and the engine output is controlled with a predetermined control variable so that the amount of slip of the driving wheels converges on a target value wherein the improvement comprises a reverse detecting means which detects that the vehicle once reversed before it began to run forward upon start on an ascending slope, and a first limiting means which limits the control variable for said traction control when the reverse detecting means detects that the vehicle once reversed before it began to run forward upon start on an ascending slope.

7. A slip control system as defined in claim 6 in which a determining means which determines that the friction coefficient $\mu$ of the road surface is high when the engine speed tends to fall as a result of the traction control upon start on an ascending slope is provided and said first limiting means limits the control variable for said traction control only when the reverse detecting means detects that the vehicle once reversed before it began to run forward upon start on an ascending slope and at the same time the determining means determines that the friction coefficient $\mu$ of the road surface is high.

8. A slip control system as defined in claim 7 further comprising a second limiting means which limits the control variable for the traction control when said determining means determines that the friction coefficient $\mu$ of the road surface is high and the engine speed is not higher than a preset engine speed.

9. A slip control system as defined in claim 8 in which said preset engine speed is increased after the limitation of the control variable by the first limiting means is performed.

10. A slip control system as defined in claim 8 further comprising a limitation releasing means which releases the limitation of the control variable by the second limiting means when the engine speed increases, as a result of the limitation of the control variable by the second limiting means, by a predetermined value from a minimum engine speed to which the engine speed fell as a result of the traction control before limitation of the control variable.

11. A slip control system as defined in claim 10 in which release of the limitation by the second limiting means is delayed after the limitation of the control variable by the first limiting means is performed as compared with when the limitation of the control variable by the first limiting means is not performed.

12. A slip control system as defined in claim 11 further comprising a correction means which reduces the control variable for the traction control after the limitation releasing means releases the limitation of the control variable by the second limiting means.

13. A slip control system as defined in claim 6 in which said vehicle is provided with a manual transmission.

14. A slip control system for a vehicle comprising a traction control means for effecting traction control in which the amount of slip of the driving wheels of the vehicle relative to the road surface is detected and the engine output is controlled with a predetermined control variable so that the amount of slip of the driving wheels converges on a target value wherein the improvement comprises a friction coefficient determining means which determines whether the friction coefficient $\mu$ of the road surface is high or low, a limiting means which more limits the control variable for said traction control when the friction coefficient determining means determines that the friction coefficient $\mu$ of the road surface is high than when the friction coefficient determining means determines that the friction coefficient $\mu$ of the road surface is low, and an inhibiting means which inhibits the friction coefficient determining means from determining that the friction coefficient $\mu$ of the road surface is high after it determines that the friction coefficient $\mu$ of the road surface is low until the current traction control is terminated.

15. A slip control system as defined in claim 14 further comprising a first correction means which increases the control variable for the traction control by a first correction value for a first predetermined period after the limitation by the limiting means is released, and a second correction means which increases the control variable for the traction control by a second correction value for a second predetermined period after the time said friction coefficient determining means determines that the friction coefficient μ of the road surface is low.

16. A slip control system as defined in claim 15 in which said second correction value is larger than the first correction value.

17. A slip control system as defined in claim 14 in which said friction coefficient determining means determines that the friction coefficient μ of the road surface is high when the engine speed tends to fall as a result of the traction control during running on an ascending slope and that the friction coefficient μ of the road surface is low when the rate of increase of the engine speed is not lower than a predetermined value as a result of the traction control during running on an ascending slope.

18. A slip control system as defined in claim 14 in which said limiting means releases the limitation of the control variable when the engine speed increases by a predetermined value from a minimum engine speed to which the engine speed fell as a result of the traction control before limitation of the control variable.

19. A slip control system as defined in claim 14 in which said vehicle is provided with a manual transmission.

* * * * *